US011539272B2

(12) United States Patent
Murakami et al.

(10) Patent No.: US 11,539,272 B2
(45) Date of Patent: Dec. 27, 2022

(54) ELECTRIC POWER TOOL

(71) Applicant: Panasonic Intellectual Property Management Co., Ltd., Osaka (JP)

(72) Inventors: Hiroaki Murakami, Kyoto (JP); Mitsumasa Mizuno, Osaka (JP); Akiko Honda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/617,491

(22) PCT Filed: Mar. 14, 2018

(86) PCT No.: PCT/JP2018/009894
§ 371 (c)(1),
(2) Date: Nov. 26, 2019

(87) PCT Pub. No.: WO2018/220942
PCT Pub. Date: Dec. 6, 2018

(65) Prior Publication Data
US 2020/0186008 A1 Jun. 11, 2020

(30) Foreign Application Priority Data

May 30, 2017 (JP) .............................. JP2017-107100

(51) Int. Cl.
*H02K 11/215* (2016.01)
*H02K 11/22* (2016.01)
(Continued)

(52) U.S. Cl.
CPC .............. *H02K 11/215* (2016.01); *B25F 5/00* (2013.01); *H02K 7/145* (2013.01); *H02K 11/22* (2016.01);
(Continued)

(58) Field of Classification Search
CPC ......... B25B 21/00; B25B 23/14; B25B 21/02; B25F 5/02; B25F 5/00; B25F 5/008;
(Continued)

(56) References Cited

U.S. PATENT DOCUMENTS

| 5,936,397 A | 8/1999 | Benkert et al. |
| 6,134,973 A | 10/2000 | Schoeps |

(Continued)

FOREIGN PATENT DOCUMENTS

| JP | H10-329051 A | 12/1998 |
| JP | 2006-972 A | 1/2006 |

(Continued)

OTHER PUBLICATIONS

International Search Report issued in corresponding International Patent Application No. PCT/JP2018/009894, dated Apr. 24, 2018, with English translation.

(Continued)

*Primary Examiner* — Anna K Kinsaul
*Assistant Examiner* — Luis G Del Valle
(74) *Attorney, Agent, or Firm* — McDermott Will & Emery LLP

(57) ABSTRACT

A motor retainer is provided on an inner circumferential surface of a housing and retains an outer circumference of a motor unit. A rotation detector includes a rotating body attached to a motor shaft and a position detector that outputs a rotational position signal corresponding to a rotational position of the rotating body. A sensor substrate retainer is provided on the inner circumferential surface of the housing and retains the position detector at a position facing the rotating body.

5 Claims, 1 Drawing Sheet

(51) Int. Cl.
*B25F 5/00* (2006.01)
*H02K 7/14* (2006.01)
*B25B 21/02* (2006.01)

(52) U.S. Cl.
CPC .............. *B25B 21/02* (2013.01); *B25F 5/001* (2013.01); *B25F 5/008* (2013.01)

(58) Field of Classification Search
CPC ....... B25F 5/001; H02K 11/215; H02K 7/215; B25C 7/00
See application file for complete search history.

(56) References Cited

U.S. PATENT DOCUMENTS

| | | | | |
|---|---|---|---|---|
| 8,573,323 | B2* | 11/2013 | Muller | A01G 3/06 173/217 |
| 9,360,295 | B2* | 6/2016 | Taniguchi | G01D 11/30 |
| 2004/0232787 | A1* | 11/2004 | Kopf | H02K 5/225 310/89 |
| 2005/0168187 | A1 | 8/2005 | Uchiyama et al. | |
| 2008/0211357 | A1* | 9/2008 | Kataoka | H02K 11/215 310/90 |
| 2009/0284105 | A1* | 11/2009 | Miyashita | H02K 5/1732 310/68 B |
| 2010/0321006 | A1* | 12/2010 | Suzuki | G01P 3/487 324/207.25 |
| 2013/0026888 | A1* | 1/2013 | Migita | H02K 29/08 310/68 B |
| 2013/0140963 | A1* | 6/2013 | Yoshidomi | H02K 11/215 310/68 B |
| 2013/0264915 | A1* | 10/2013 | Suzuki | B62D 5/049 310/68 B |
| 2014/0015384 | A1* | 1/2014 | Someya | G01B 7/30 310/68 B |
| 2014/0300254 | A1* | 10/2014 | Yoshidomi | G01P 3/4815 310/68 B |
| 2015/0019019 | A1* | 1/2015 | Veres | H02P 8/34 700/275 |
| 2016/0352190 | A1* | 12/2016 | Hieda | H02K 11/215 |
| 2017/0129091 | A1* | 5/2017 | Schiegel | B25D 17/08 |
| 2020/0067385 | A1* | 2/2020 | Dib | H02K 5/1732 |
| 2021/0099052 | A1* | 4/2021 | Suzuki | H02K 3/522 |

FOREIGN PATENT DOCUMENTS

| | | | | |
|---|---|---|---|---|
| JP | 2006000972 | A | * | 1/2006 |
| JP | 2007-136607 | A | | 6/2007 |
| JP | 2012-035358 | A | | 2/2012 |
| JP | 2012-71360 | A | | 4/2012 |
| WO | WO-2009068347 | A1 | * | 6/2009 ................ B25F 5/02 |

OTHER PUBLICATIONS

Extended European Search Report issued in corresponding European Patent Application No. 18810603.3, dated Jun. 3, 2020.
Office Action issued for corresponding European Patent Application No. 18810603.3, dated Nov. 8, 2021.

* cited by examiner

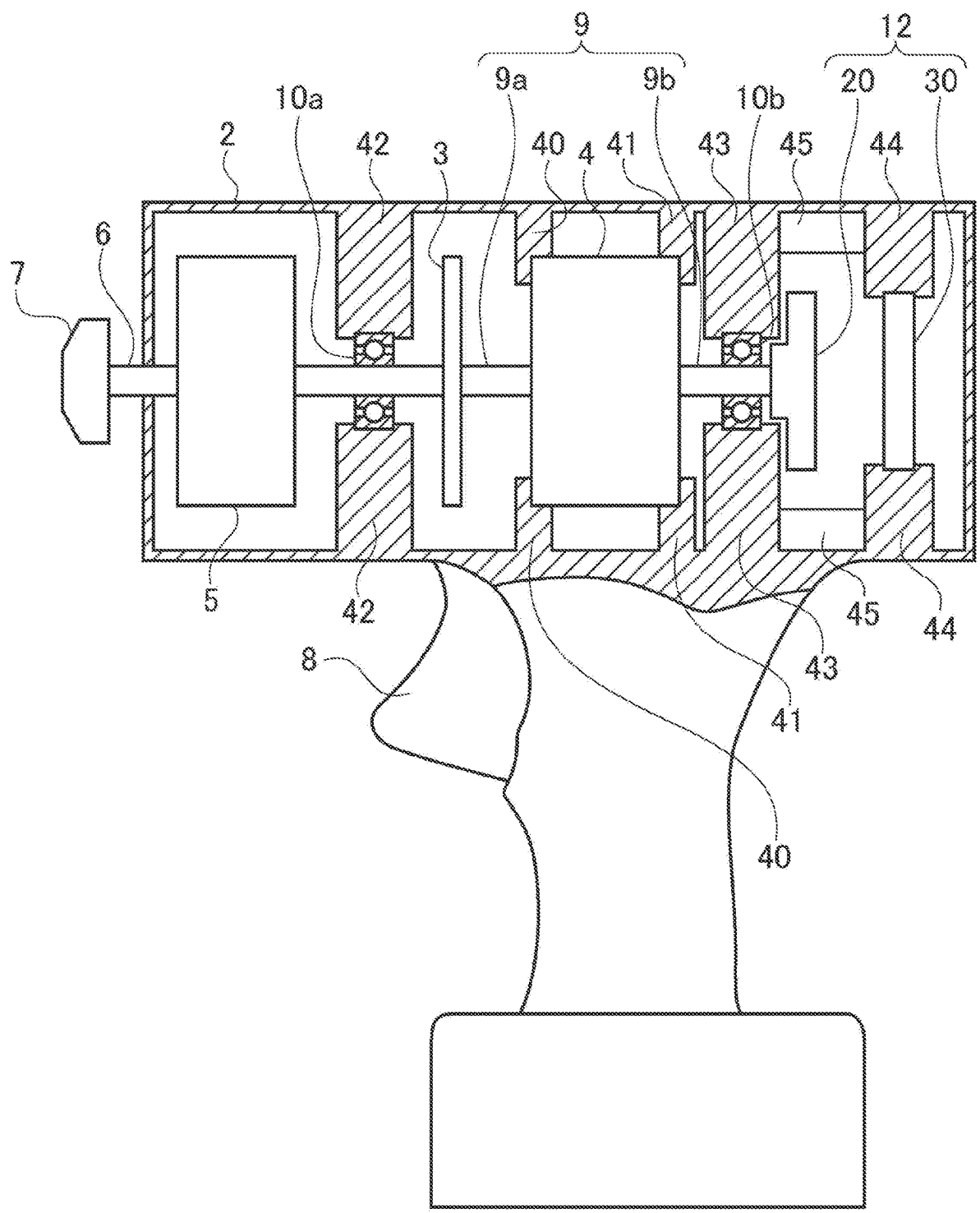

ELECTRIC POWER TOOL

CROSS-REFERENCE TO RELATED APPLICATIONS

This application is the U.S. National Phase under 35 U.S.C. § 371 of International Patent Application No. PCT/JP2018/009894, filed on Mar. 14, 2018, which in turn claims the benefit of Japanese Patent Application No. 2017-107100, filed on May 30, 2017, the entire disclosures of which Applications are incorporated by reference herein.

TECHNICAL FIELD

The present disclosure relates to an electric power tool including a rotation detector for detecting the angle of rotation of a motor.

BACKGROUND ART

It is common to use a built-in motor in a hand-held electric power tool used to bore a hole or to tighten a screw, etc. to reduce the size and weight (e.g., patent literatures 1-3). A built-in motor is configured by assembling the constituting elements of the motor directly in a rib member provided to project from the inner circumferential surface of the housing.

PATENT LITERATURE

[Patent Literature 1] JP2007-136607
[Patent Literature 2] JP2006-972
[Patent Literature 3] JP2012-71360

SUMMARY OF INVENTION

Technical Problem

In electric power tools such as a rotary impact tool, control for estimating the tightening torque from the angle of rotation of the motor is exercised. To increase the precision of estimating the tightening torque, a rotation detector for detecting the angle of rotation of the motor with a high precision needs to be provided in the electric power tool.

The disclosure addresses the above-described issue, and a general purpose thereof is to provide a technology of efficiently providing a rotation detector in an electric power tool.

Solution to Problem

An electric power tool according to an embodiment of the present disclosure is an electric power tool in which a motor located in a housing is a built-in motor that does not have a motor case, the electric power tool including: a first retainer that is provided on an inner circumferential surface of the housing and retains an outer circumference of the motor; a transmission mechanism that transmits a rotational output of the motor to a front-end tool; and a rotation detector that detects an angle of rotation of the motor. The rotation detector includes a rotating body attached to a motor shaft of the motor and a position detector that outputs a rotational position signal corresponding to a rotational position of the rotating body. The electric power tool further includes: a second retainer that is provided on the inner circumferential surface of the housing and retains the position detector at a position facing the rotating body.

BRIEF DESCRIPTION OF DRAWINGS

FIG. 1 is a schematic cross-sectional view of a part of an electric power tool according to an embodiment.

DESCRIPTION OF EMBODIMENTS

FIG. 1 is a schematic cross-sectional view of a part of an electric power tool according to an embodiment of the present disclosure. An electric power tool 1 includes a housing 2, and a motor unit 4 is built in the housing 2. The motor unit 4 is configured as a built-in motor that functions by building a stator and a rotor, integrated with a motor shaft 9, in the housing 2. The absence of a motor case contributes to the compact size and light weight of the electric power tool 1. The motor shaft 9 in front of the motor unit 4 will be referred to as "a motor shaft 9a" and the motor shaft behind will be referred to as "a motor shaft 9b". A cooling fan 3 (centrifugal fan) is fixed to the motor shaft 9a.

A driving block 5 includes a transmission mechanism for transmitting a rotational output of the motor to a front-end tool. More specifically, the driving block 5 may include a power transmission mechanism for transmitting the rotational output of the motor shaft 9a to an output shaft 6. The power transmission mechanism may include a planetary gear deceleration mechanism in mesh with a pinion gear attached to the motor shaft 9a. In the case the electric power tool 1 is a rotary impact tool, the power transmission mechanism includes an impact mechanism for generating an intermittent rotary impact force in the output shaft 6. A chuck mechanism 7 is coupled to the output shaft 6. A front-end tool such as a drill and a driver is removably attached to the chuck mechanism 7. A user operation switch 8 controlled by an operator is provided in a grip of the housing 2. When the operator pulls the user operation switch 8, the rotor in the motor unit 4 is rotated so that the output shaft 6 drives the front-end tool. The motor unit 4 is a brushless motor of an inner rotor type. The rotor including a plurality of permanent magnets is rotated in a space inward of a stator.

A rotation detector 12 for detecting the angle of rotation of the motor is provided behind the motor unit 4. The rotation detector 12 includes a rotating body 20 attached to the motor shaft 9b and a position detector 30 for outputting a rotational position signal corresponding to the rotational position of the rotating body 20. The rotation detector 12 may be a magnetic encoder or an optical encoder.

In the case the rotation detector 12 is a magnetic encoder, the rotating body 20 includes a magnet, and the position detector 30 includes a magnetic sensor for detecting variation in magnetic force. To increase the precision of detecting the angle of motor rotation, the gap between the rotating body 20 and the position detector 30 is configured to be small. For example, the gap is about 2 mm. In the case the rotation detector 12 is an optical encoder, the rotating body 20 is a rotating disc formed with a slit that shields/transmits light. The position detector 30 includes a light receiving device such as a photodiode. The rotation detector 12 may be an encoder of a desired type. The position detector 30 is formed on a sensor substrate and outputs a rotational position signal of the rotating body 20 to a controller (not shown) for controlling the motor rotation.

The rotor and the stator that constitute the motor unit 4 are fixed separately and independently to the housing 2. The housing 2 includes motor retainers 40, 41 and bearing retainers 42, 43 to assemble the motor unit 4 in the housing 2. The housing 2 is comprised of a pair of (left and right) half housing members sandwiching a perpendicular plane that crosses the line of rotational axis at the center of the electric power tool 1. Therefore, the motor retainers 40, 41 and the bearing retainers 42, 43 are formed by joining the pair of half housing members. The motor unit 4 is assembled in the housing 2 by building the stator, a first bearing 10a for the motor shaft 9a, and a second bearing 10b for the motor shaft 9b into one of the housing members, aligning the other housing member with the assembly, and joining the pair of housing members by, for example, tightening a screw.

The motor retainer 40 is a rib member provided $t_o$ project from the inner circumferential surface of the housing 2 to retain motor unit 4 at or near one end thereof, and, in this case, the outer circumference of the motor unit 4 at or near the front end thereof. The motor retainer 40 is comprised of rib members respectively formed in the pair of half housing members. The plurality of rib members sandwich and fix the outer circumference of the stator at or near the front end thereof.

The motor retainer 41 is a rib member provided to project from the inner circumferential surface of the housing 2 to retain the motor unit 4 at or near the other thereof, and, in this case, the outer circumference of the motor unit 4 at or near the back end thereof. The motor retainer 41 is comprised of rib members respectively formed in the pair of half housing members. The plurality of rib members sandwich and fix the outer circumference of the stator at or near the back end thereof.

The bearing retainer 42 is a rib member provided to project from the inner circumferential surface of the housing 2 to retain the outer circumference of the first bearing 10a supporting the motor shaft 9a. The bearing retainer 42 is comprised of rib members respectively formed in the pair of half housing members. The plurality of rib members sandwich and fix the outer circumference of the first bearing 10a.

The bearing retainer 43 is a rib member provided to project from the inner circumferential surface of the housing 2 to retain the outer circumference of the second bearing 10b supporting the motor shaft 9b. The bearing retainer 43 is comprised of rib members respectively formed in the pair of half housing members. The plurality of rib members sandwich and fix the outer circumference of the second bearing 10b.

In this embodiment, the sensor substrate carrying the position detector 30 is attached to the housing 2. The position detector 30 and the rotating body 20 realize a highly precise angle detection function by being provided across a predetermined gap. In the case the sensor substrate carrying the position detector 30 is attached to the motor unit 4, it is not easy to adjust (fix) the position if the position detector 30 is shifted in position with respect to the rotating body 20 due, for example, to a drop impact of the electric power tool 1. This is addressed by this embodiment by attaching the position detector 30 in a sensor substrate retainer 44 to facilitate the assembly of the position detector 30 and to make it easy to adjust (fix) the position in the event that the positions of the rotating body 20 and the position detector 30 are shifted from each other.

The sensor substrate retainer 44 is provided on the inner circumferential surface of the housing 2 and retains a sensor substrate carrying the position detector 30 at a position facing the rotating body 20. The sensor substrate retainer 44 may be comprised of rib members provided to project from the inner circumferential surface of the pair of half housing members in a direction substantially perpendicular to the rotational axis. The sensor substrate retainer 44 sandwiches and fixes the outer circumference of the sensor substrate carrying the position detector 30.

The sensor substrate retainer 44 need not retain the entirety of the outer circumference of the sensor substrate and may retain a predetermined portion of the outer circumference of the sensor substrate to fix the position detector 30 at a predetermined position facing the rotating body 20. In the case the sensor substrate is configured in a rectangular shape, the sensor substrate retainer 44 may be a rib member that fixes the four corners of the sensor substrate.

In this embodiment, the position detector 30 is attached to the housing 2. Therefore, if the housing 2 is deformed at or near the back end thereof as the electric power tool 1 drops, the rotating body 20 and the position detector 30 may be displaced relative to each other. This $i_s$ addressed by this embodiment by providing a linking rib 45 that links the sensor substrate retainer 44 and the bearing retainer 43 in order to maintain the relative positions of the rotating body 20 and the position detector 30.

The linking rib 45 is provided to project to stand on the inner circumferential surface of the housing 2 and extends in parallel to the direction of rotational axis to link the sensor substrate retainer 44 and the bearing retainer 43 physically. The linking rib 45 is a reinforcing rib for increasing the strength of the housing between the sensor substrate retainer 44 and the bearing retainer 43 and inhibits displacement of relative position between the sensor substrate retainer 44 and the bearing retainer 43. This maintains the gap between the rotating body 20 and the position detector 30 to be of a predetermined value and realizes the rotation detector 12 capable of detecting the angle of motor rotation with a high precision.

The rotation detector 12 may be housed in a space substantially sealed by a rib member provided in the housing 2. By housing the rotation detector 12 in a substantially sealed space and inhibiting a flow of the dust, etc. from outside, the highly precise rotational angle detection function of the rotation detector 12 is maintained. In the example shown in FIG. 1, for example, the space for housing the rotation detector 12 can be substantially sealed by forming the bearing retainer 43 so as to block an air flow in the longitudinal direction of the tool.

Described above is an explanation based on an exemplary embodiment. The embodiment is intended to be illustrative only and it will be understood by those skilled in the art that various modifications to constituting elements and processes could be developed and that such modifications are also within the scope of the present disclosure.

One embodiment of the present invention is summarized below. An electric power tool (1) according to an embodiment of the present disclosure is an electric power tool in which a motor (4) located in a housing (2) is a built-in motor that does not have a motor case, the electric power tool comprising: a first retainer (40, 41) that is provided on an inner circumferential surface of the housing and retains an outer circumference of the motor; a transmission mechanism (5) that transmits a rotational output of the motor to a front-end tool; and a rotation detector (12) that detects an angle of rotation of the motor. The rotation detector (12) includes a rotating body (20) attached to a motor shaft (9b) of the motor and a position detector (30) that outputs a rotational position signal corresponding to a rotational position of the rotating body. The electric power tool further includes: a second retainer (44) that is provided on the inner circumferential surface of the housing and retains the position detector (30) at a position facing the rotating body (20).

The second retainer (44) may be a rib member that projects from the inner circumferential surface of the housing in a direction substantially perpendicular to a rotation axis. The electric power tool (1) may further includes: a third retainer (43) that is provided on the inner circumferential surface of the housing and retains an outer circumference of a bearing (10b) that supports the motor shaft (9b); and a linking rib (45) that links the second retainer (44) and the third retainer (43). The linking rib (45) is preferably provided on the inner circumferential surface of the housing to extend in a direction of rotational axis. The rotation detector (12) is preferably housed in a space substantially sealed by a rib member provided in the housing.

REFERENCE SIGNS LIST

1 . . . electric power tool, 2 . . . housing, 4 . . . motor unit, 5 . . . driving block, 6 . . . output shaft, 9a, 9b . . . motor shaft, 10b . . . second bearing, 12 . . . rotation detector, 20 . . . rotating body, 26 . . . magnet, 27 . . . fixing bush, 30 . . . position detector, 40, 41 . . . motor retainer, 42, 43 . . . bearing retainer, 44 . . . sensor substrate retainer, 45 . . . linking rib

INDUSTRIAL APPLICABILITY

The present invention can be used in the field of electric power tools.

The invention claimed is:

1. An electric power tool in which a motor located in a housing is a built-in motor that does not have a motor case, the electric power tool comprising:
   a first retainer that is provided on and protruding from an inner circumferential surface of the housing and retains an outer circumference of the motor;
   a transmission mechanism that transmits a rotational output of the motor to a front-end tool; and
   a rotation detector that detects an angle of rotation of the motor, wherein the rotation detector includes a rotating body attached to a motor shaft of the motor and a position detector that outputs a rotational position signal corresponding to a rotational position of the rotating body, and the electric power tool further comprises:
   a second retainer that is provided on and protruding from the inner circumferential surface of the housing and retains a sensor substrate carrying the position detector at a position so that the rotating body and the position detector are arranged in line with a rotational axis of the motor shaft in that order from the front-end tool, and the position detector faces the rotating body;
   a third retainer that is provided on and protruding from the inner circumferential surface of the housing and retains an outer circumference of a bearing that supports the motor shaft; and
   a reinforcing rib that is provided on the inner circumferential surface of the housing and that extends between and is in direct contact with the second retainer and the third retainer to connect the second retainer and the third retainer, the reinforcing rib, which is not in contact with the sensor substrate and the bearing, being only for reinforcing the housing between the second retainer and the third retainer.

2. The electric power tool according to claim 1, wherein the second retainer is a rib member that projects from the inner circumferential surface of the housing in a direction substantially perpendicular to a rotation axis.

3. The electric power tool according to claim 1, wherein the reinforcing rib is provided on the inner circumferential surface of the housing to extend in a direction of the rotational axis.

4. The electric power tool according to claim 1, wherein the rotation detector is housed in a space substantially sealed by a rib member provided in the housing.

5. The electric power tool according to claim 1, wherein the motor and the rotation detector are enclosed by the housing.

* * * * *